United States Patent [19]

Liguori

[11] Patent Number: 5,587,811
[45] Date of Patent: Dec. 24, 1996

[54] HALFTONE SCREEN USING SPOT FUNCTION TO RANK PIXELS FOLLOWING ONE OR MORE DESIGN RULES

[75] Inventor: Thomas A. Liguori, San Diego, Calif.

[73] Assignee: Dataproducts Corporation, Simi Valley, Calif.

[21] Appl. No.: 430,881

[22] Filed: Apr. 28, 1995

[51] Int. Cl.$^6$ .............................. H04N 1/405; H04N 1/52
[52] U.S. Cl. ...................... 358/456; 358/458; 358/534; 358/536
[58] Field of Search ................................. 358/456, 457, 358/458, 465, 466, 534, 535, 536, 298

[56] References Cited

U.S. PATENT DOCUMENTS

| | | |
|---|---|---|
| 4,149,194 | 4/1979 | Holladay . |
| 4,969,052 | 11/1990 | Ishida et al. . |
| 5,014,333 | 5/1991 | Miller et al. . |
| 5,045,952 | 9/1991 | Eschbach . |
| 5,130,823 | 7/1992 | Bowers . |
| 5,196,942 | 3/1993 | Shiau . |
| 5,226,096 | 7/1993 | Fan . |
| 5,243,443 | 9/1993 | Eschbach . |
| 5,268,774 | 12/1993 | Eschbach . |
| 5,287,194 | 2/1994 | Blumer ................................. 358/457 |
| 5,291,296 | 3/1994 | Hains . |
| 5,305,118 | 4/1994 | Schiller et al. ........................ 358/456 |
| 5,317,653 | 5/1994 | Eschbach et al. . |
| 5,321,525 | 6/1994 | Hains . |
| 5,325,211 | 6/1994 | Eschbach . |

OTHER PUBLICATIONS

Roetling, Paul G., Halftone method with edge enhancement and Moire suppression, J.Opt.SocAm., vol. 66, No. 10, Oct., 1976.
Billotet–Hoffmann, C. and Bryngdahl, O., On the Error Diffusion Technique for Electronic Halftoning, Physics Department, University of Essen, Federal Republic of Germany.
Floyd, Robert W. and Steinberg, Louis, An Adaptive Algorithm for Spatial Greyscale.
Jarvis, J. F., Judice, C. N., and Ninke, W. H., A Survey of Techniques for the Display of Continuous Tone Pictures of Bilevel Displays, Computer Graphics and Image Processing, 5, 13–40 (1976).
Ulilchney, R., Digital Halftoning, Chapters 1, 2, and 6.

*Primary Examiner*—Scott A. Rogers
*Attorney, Agent, or Firm*—Loeb & Loeb LLP

[57] ABSTRACT

A method of halftoning over a region of output pixels by defining large halftone cells corresponding to regions of contiguous pixels and partitioning the larger halftone cells into smaller halftone cells is disclosed. The number of levels of gray determined by the number of pixels within the larger halftone cell while resolution is defined by the size of the smaller halftone cells within the larger halftone cells. A predetermined level of gray determines the number of pixels to darken within the larger halftone cell and the pixels are darkened within the smaller halftone cell according to a spot function. The larger halftone cells are partitioned into smaller halftone cells such that the larger halftone cell has exactly one center smaller halftone cell.

24 Claims, 7 Drawing Sheets

| Rank | Sub-halftone Cell | dx | dy | Offset (R) | Priority |
|------|-------------------|-----|------|------------|----------|
| 82 | 6A | -.1 | -.2 | 1.0 | .9500 |
| 83 | 6H | .1 | .18 | .993 | .9498 |
| 84 | 6B | -.2 | .1 | .999 | .9490 |
| 85 | 6D | -.15 | -.16 | .997 | .9489 |
| 86 | 6E | -.1 | .2 | .996 | .9460 |
| 87 | 6G | .16 | -.16 | .994 | .9430 |
| 88 | 6C | -.1 | -.22 | .998 | .9400 |
| 89 | 6F | -.21 | .16 | .995 | .9250 |
| 90 | 6I | .15 | -.20 | .992 | .9300 |

FIG. 7

HALFTONE SCREEN USING SPOT FUNCTION TO RANK PIXELS FOLLOWING ONE OR MORE DESIGN RULES

BACKGROUND OF THE INVENTION

Image information is commonly generated in a bitmap format where the bitmap comprises a plurality of "gray" level pixels (or hue concentration level pixels for color images). Pixels over a given area are defined by digital values, wherein each digital value represents a gray or hue concentration level among a number of gray or hue concentration levels within the area. Thus, in a region of 25 pixels, there are 26 levels of gray or hue concentration where each level represents an increment between black (or solid color) and white.

One standard method of converting gray or hue concentration level pixel image data into binary level pixel image data is through the use of dithering or halftoning processes. In such arrangements, over a given area having a number of gray or hue concentration level pixels therein, each pixel of an array within the area is compared to one of a set of pre-selected thresholds. This given area represents the "halftone cell". The effect of such an arrangement is that, for an area where the image is gray or some shade of a hue, some of the thresholds within the halftone cell will be exceeded, while others are not.

In the binary case, the pixels or cell elements for which thresholds are exceeded are printed as black while the remaining elements are allowed to remain white. The human eye integrates the distribution of white and black over the cell as gray. In this manner, there can be gradual transitions from different shades of gray among adjacent halftone cells.

For color applications, several halftone cells, each corresponding to a different hue, are formed for a given area. The color system superimposes the halftone cells of different hues to form the desired color of the image. Halftoning facilitates varying the concentration or intensity level of hues within the color image by varying the number of darkened pixel for halftone cells corresponding to particular hues. In this manner, the image can have transitions between neighboring colors among adjacent halftone cells. The application of halftoning to color systems is described in detail in the Postscript Reference Manual published by Adobe.

Unfortunately, in using a halftoning technique, there is often a trade-off between maximizing the number of gray or hue concentration levels and the resolution of the image; the larger each cell is (to contain more pixels), the fewer cells will fit into a given area. Fewer cells within a given area effectively decreases resolution. This gray or hue concentration level/resolution trade-off often forces product designers to choose between reproducing an image using many gray levels but in large halftone dots (resulting in coarse, grainy images) or using fine halftone dots but only a few gray or hue concentration levels (which can cause heavy banding).

To illustrate the effects of banding, FIG. 1 shows three rows 14, 16 and 18 of halftone cells, each halftone cell having twenty five pixels 22. Each of the halftone cells in halftone rows 14 and 16 have six pixels out of a possible twenty five (or 24%) darkened. This level of darkening is also referred to as a 24% halftone screen. The halftone cells in halftone row 18 have five pixels out of a possible of twenty five (or 20%) darkened. The smallest transition interval between halftone cells with this grayscaling system is 4%, or one pixel out of twenty five. As a consequence, as the image of FIG. 1 transitions from the 24% halftone screen of halftone row 16 to the 20% halftone screen of halftone row 18, there is a noticeable jump in the gray levels between adjacent regions. This is known as banding.

Some techniques have been developed to address this trade-off between gray levels and resolution in an attempt to maximize resolution while minimizing the effects of banding. Xerox Corporation developed a technique called Quad Dot. It is believed that the Quad Dot technique divides a halftone cell into four smaller cells.

The Quad Dot system attempts to distribute darkened pixels among the smaller cells. However, it is believed that the Quad Dot system sequentially adds pixels to adjacent smaller cells in a deterministic circular fashion about the center of the larger cell. This can result in a noticeable pattern within the image.

SUMMARY OF THE INVENTION

An object of the present invention is to provide a method of halftoning that results in a balanced image over a halftone cell that achieves high resolution while minimizing the effects of banding.

The present invention is directed to a method and apparatus for halftoning which utilizes a macro halftone cell defining an area of contiguous pixels. The method and apparatus partition the macro halftone cell into a plurality of sub-halftone cells, each sub-halftone cell defining an area of contiguous pixels. A predetermined level of desired grayness or hue intensity determines the quantity of pixels to be darkened within the macro halftone cell. In accordance with one aspect of the present invention, a spot function ranks pixels within the macro halftone cell from highest to lowest such that preferably one or more of the following design rules apply: no two pixels within the same sub-halftone cell are ranked consecutively; and the rank of each individual pixel within each sub-halftone cell is a decreasing function of the distance between the center of the sub-halftone cell and the center of the pixel (e.g., a pixel closest to the center of the sub-halftone cell has the highest rank of pixels within the sub-halftone cell and a pixel furthest from the center of the sub-halftone cell has the lowest rank of pixels within the sub-halftone cell) and the number of pixels ranked above any particular pixel within the sub-halftone cell is no more than one greater and no more than one less than the number of pixels ranked above the particular pixel in any other sub-halftone cell within the macro halftone cell. Each pixel having a rank higher than or equal to a threshold ranking is darkened, wherein the threshold ranking is set so that the determined quantity of pixels is darkened. Such an arrangement has been found to provide an even distribution of darkened pixels among the halftone cells of the macro halftone cell yet maintain a high level of resolution.

In accordance with another aspect of the present invention the macro halftone is partitioned into an area of v by w contiguous sub-halftone cells where v and w are odd positive integers. Having a macro halftone cell of odd dimensions of sub-halftone cells can define exactly one center sub-halftone cell. This facilitates a balanced distribution of sub-halftone spots within the macro halftone cell to provide a balanced image across the macro halftone cell.

A preferred embodiment includes halftoning over macro halftone cells comprising 225 pixels partitioned into three by three arrangements of nine sub-halftone cells comprising 25 pixels each. By partitioning the 225 pixels of the macro halftone cell into the nine sub-halftone cells, a resolution of ⅓ of the dimension of the macro halftone cell is possible while maintaining 226 levels of gray or hue concentration.

A preferred embodiment for color superimposes macro halftone cells corresponding to the same area of the image, with each macro halftone cell corresponding to a different hue. The required intensity of a hue to provide the desired image color over a halftoning region determines the number of pixels to be darkened within the macro halftone cell corresponding to the hue.

By altering the distribution of darkened pixels within the halftone cell for a desired level of grayness, an embodiment of the present invention can produce a more balanced image in black and white. Maintaining high resolution and the large number of levels of hue concentration within the macro halftone in color printers provides a smooth transition to neighbor colors and a well balanced in-gamut distribution.

BRIEF DESCRIPTION OF THE DRAWINGS

The invention may be understood by reference to the accompanying drawings, of which:

FIG. 7 is an illustration of a ranking and thresholding of the pixels in the macro halftone cell of FIG. 6.

DESCRIPTION OF THE APPENDIX

An understanding of one embodiment of the present invention may also be aided by reference to the Appendix A which is a listing of programming instructions in the Postscript language for a circular spot function for the embodiment.

DETAILED DESCRIPTION OF THE DRAWINGS

Figure 1:
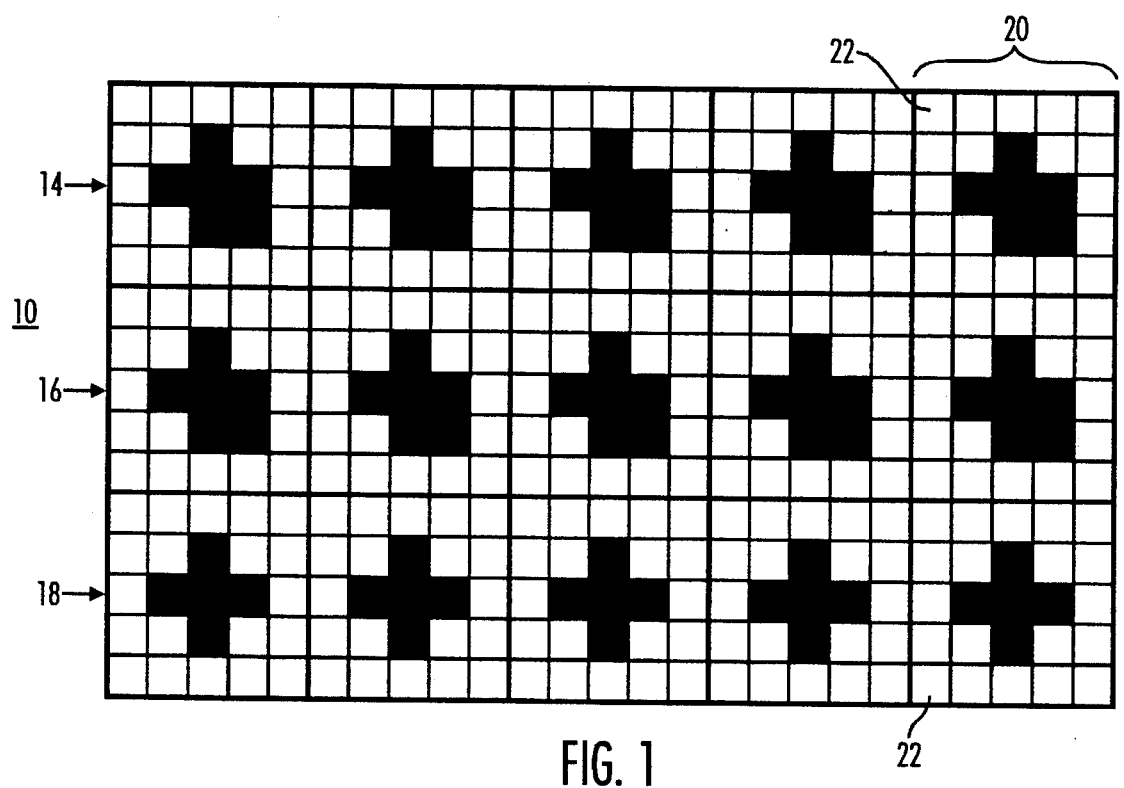
FIG. 1 is an illustration of the effects of banding in a halftoning system.
Figure 2:
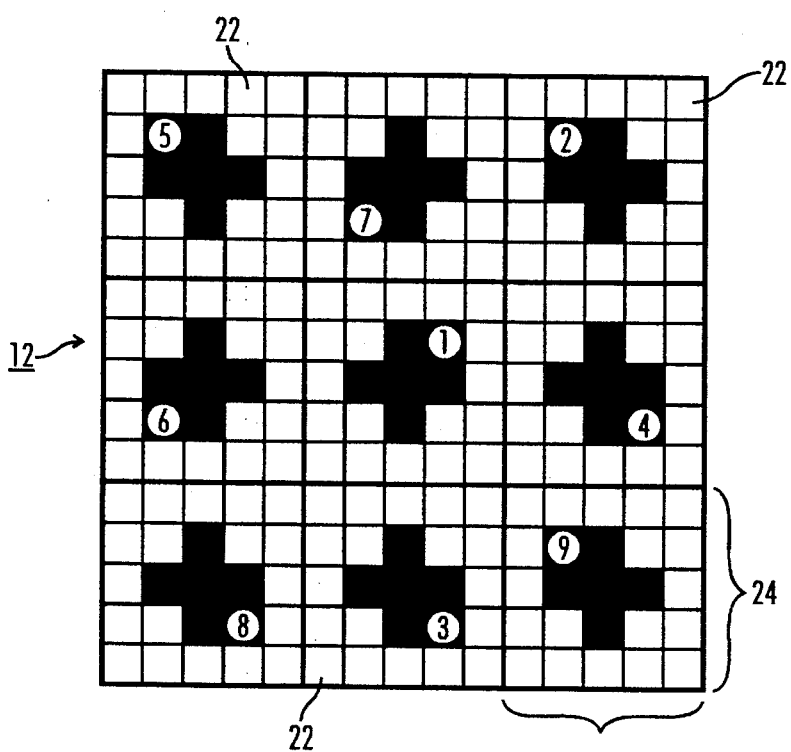
FIG. 2 is an illustration of nine sub-halftone cells within a larger macro halftone cell where pixels are added one at a time in a scattered fashion.

Referring now to the drawings where the depictions are for the purpose of describing a preferred embodiment of the invention and not for limiting the same, FIG. 2 shows a macro halftone cell 12 in accordance with one embodiment of the present invention, which defines regions of contiguous pixels 22 that facilitate the halftoning process of darkening some of the pixels and not darkening others. As the macro halftone cell 12 has 225 pixels, each cell is capable of scaling over 226 levels of gray or hue concentration.

As shown in FIG. 2, macro halftone cell 12 is partitioned into several sub-halftone cells 24 defining regions of contiguous pixels within the macro halftone cells. The macro halftone cell 12 of the illustrated embodiment is partitioned into nine sub-halftone cells 24 in a 3×3 matrix with each sub-halftone cell having twenty five pixels, for example.

The preferred embodiment performs halftoning by selectively darkening pixels within the sub-halftone cells that make up the macro halftone cell. Hence, this method does not merely perform halftoning within each of the sub-halftone cells separately but over the entire macro halftone cell.

By partitioning the macro halftone cells into smaller sub-halftone cells, this system of halftoning can achieve both high resolution and a large number of levels of gray or hue concentration and thereby also reduce banding. In the illustrated embodiment, the macro halftone cells arranged at twenty lines per inch, assuming each dot represents 300 dpi (dots per inch), can achieve the same image sharpness as halftone cells having a resolution of sixty lines per inch by generating nine sub-patterns simultaneously within the nine sub-halftone cells of the macro halftone cell.

Thus, it is seen that the embodiment of FIG. 2 partitions the pixels of each macro halftone cell 12 into three by three configurations of sub-halftone cells 24 with twenty five pixels in each sub-halftone cell. By partitioning macro halftone cells into configurations of v by w sub-halftone cells, where v and w are odd positive integers, each macro halftone cell has a center sub-halftone cell. This symmetry can provide a more balanced image across contiguous macro halftone cells than is possible in some prior systems of halftone cells having no unique center sub-halftone cell.

The level of desired grayness or hue intensity in the macro halftone determines the number or percentage of pixels to be darkened over the macro halftone cell. Once the number of pixels to be darkened is determined, these darkened pixels are preferably distributed evenly among the sub-halftone cells of the macro halftone cell. The preferred embodiment ranks all pixels within the macro halftone cell relative to one another and darkens all pixels having a rank equal to or exceeding a threshold rank which is selected in accordance with the number of pixels to be darkened for the selected gray or hue concentration level. The color system embodiment determines a hue concentration for each of the superimposed macro halftone cells in the halftoning region. The desired intensity for the hue in the image over the halftoning region determines the hue concentration for the macro halftone cell.

A spot function determines the rank of each pixel within each macro halftone cell. The spot function preferably ranks the pixels among the different sub-halftone cells within the macro halftone cell so as to evenly distribute successively darkened pixels among the sub-halftone cells. Preferably, the number of darkened pixels of each sub-halftone cell does not exceed by more than one the number of darkened pixels of any other sub-halftone cell within the macro halftone cell.

The embodiment of FIG. 2 initially shows five pixels as being darkened within each of the nine sub-halftone cells containing twenty five pixels each. Hence, a total of forty five pixels out 225 pixels within the macro halftone are already darkened. This corresponds to a hue intensity or halftone screen of 45/225 or 20%. The spot function has determined that the first five pixels to be darkened within each sub-halftone cell are the center pixels, the pixels immediately above, below, to the left and to the right of the center pixels (although, as explained below, not necessarily in that order for each sub-halftone cell). Darkening one additional pixel in one or more of each of the sub-halftone cells darkens the macro halftone cell up to an additional nine levels corresponding to each additional darkened pixel. Thus, for example, if pixel 1 of the center sub-halftone cell is darkened, the halftone screen is raised to 20.44%. Similarly, if pixel 2 of the upper right corner sub-halftone cell is also darkened, the intensity is raised to 20.9%, and so on.

To achieve one of the nine possible gray levels between 20% (five darkened pixels within every sub-halftone cell) and 24% (six pixels darkened within every sub-halftone cell), in the embodiment of FIG. 2, each successive pixel to be darkened is distributed evenly among the sub-halftone cells one at a time for each increasingly darker level (in 0.44% increments). The preferred embodiment ranks all pixels within the macro halftone cell according to a spot function which determines which pixels are darkened for a desired level of gray or hue concentration. In the example of FIG. 2, nine consecutive levels of gray darker than 20% are achieved by sequentially darkening pixels 1 through 9 which are numbered in accordance with this respective rank as assigned by the spot function. Similarly in the color embodiment, to achieve one of the possible hue concentrations between 20% and 24%, the color embodiment darkens additional pixels among the sub-halftone cells of the macro halftone cell of the hue according to the rank of pixels within the macro halftone cell for each increasing level of hue concentration over the halftoning region. Gray or hue levels beyond 24% are achieved by darkening additional pixels.

The spot function preferably ranks the pixels within the sub-halftone cell so that pixels are selected for darkening within the sub-halftone cells in a scattered pattern, starting at the center of each sub-halftone cell and working outward in a well distributed fashion as each pixel is added. That is, the pixel positions of successively darkened pixels within the respective sub-halftone are visually uncorrelated. For example, pixel 5 is the pixel immediately above and to the left of the center pixel within its respective sub-halftone cell whereas pixel 6, immediately following pixel 5 in rank, is the pixel immediately below and to the left of the center pixel within its respective sub-halftone cell.

Additionally, the sequence of ranks of pixels from sub-halftone cell to sub-halftone cell within the macro halftone cell scatters the darkened pixels for a given level of gray or hue concentration. That is, successively darkened pixels throughout the macro halftone cell are distributed among sub-halftone cells in a scattered pattern. For example, following the first additional pixel 1 in the center sub-halftone cell, the next pixel to be darkened (i.e., pixel 2) for the next higher level screen is located in the sub-halftone cell above and to the right of the sub-halftone cell containing pixel 1. Similarly, the sub-halftone cell containing pixel 8 is located one sub-halftone cell to the left and two down from the sub-halftone cell containing the previously darkened pixel 7.

Figure 3A:
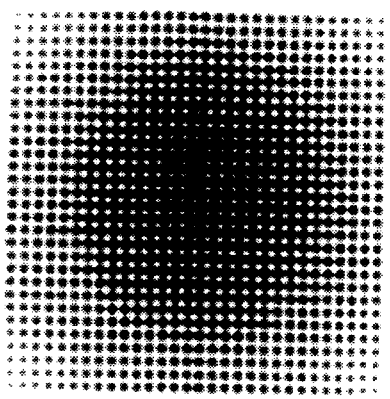
FIGS. 3a–f displays representative spot functions that can be used for allocating ranks of pixels within a sub-halftone cell.
Figure 3B:
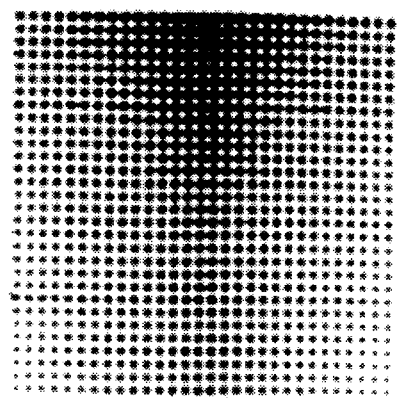
Figure 3C:
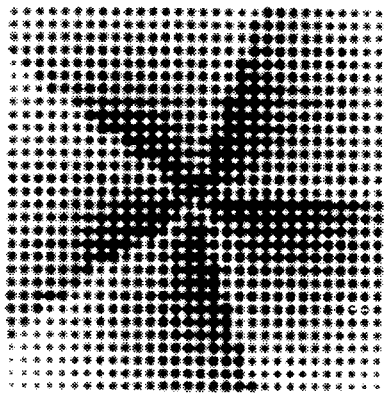
Figure 3D:
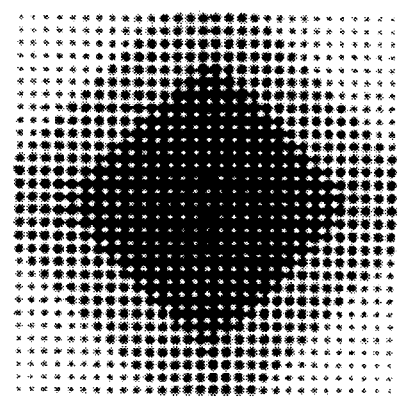
Figure 3E:
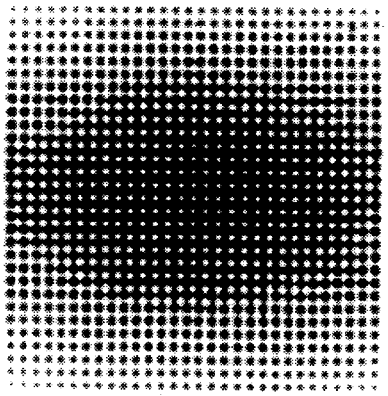
Figure 3F:
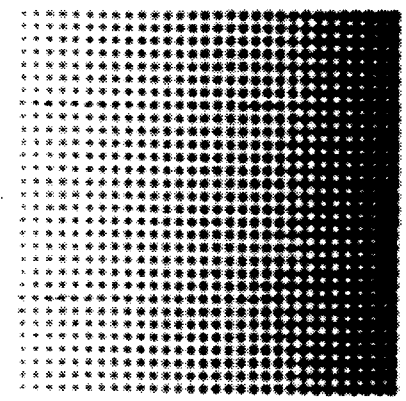

As discussed above, the preferred embodiment ranks the pixels within the sub-halftone cell according to a scattering spot function. FIG. 3 shows six examples of spot functions with each dot representing a pixel within a cell. The size of the dot corresponds to the ranking of the pixel within the cell. The spot functions of FIG. 3a–f are the circular dot, triangle, propeller, diamond, ellipse and line spot functions respectively. The spot function with respect to each of the sub-halftone cells in the preferred embodiment is a circular spot function as shown in FIG. 3a. However, other spot functions such as those shown in FIGS. 3b–f can also govern the rank of pixels within the macro halftone cell. Using the circular spot function, the preferred embodiment darkens pixels within a particular sub-halftone cell starting from the center and working outward in an evenly distributed fashion.

Figure 4:
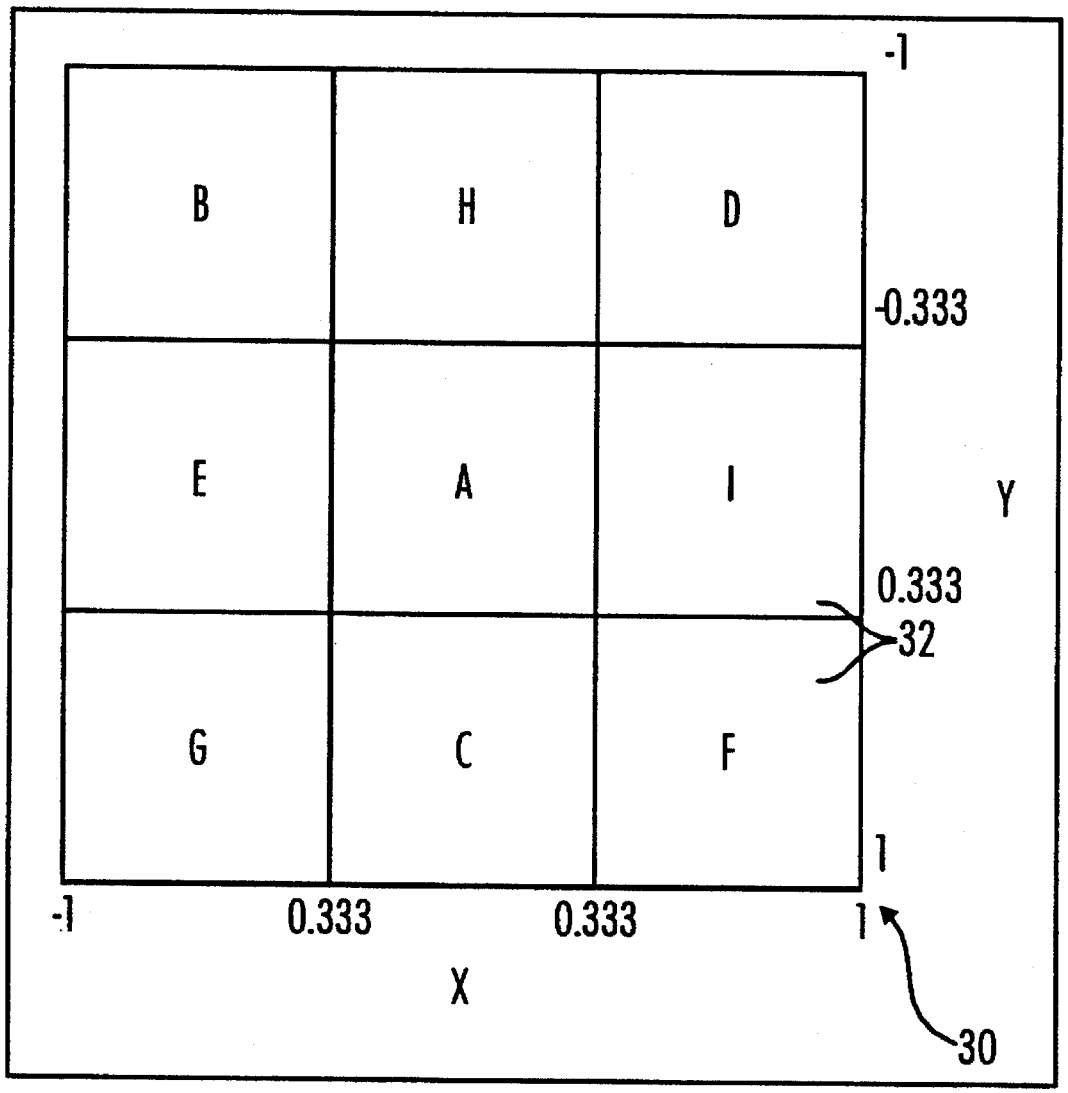
FIG. 4 identifies the boundaries of sub-halftone cells within a macro halftone cell.

The overall ranking of the pixels within each macro halftone cell 12 may be selected in an arbitrary fashion as shown in FIG. 2. Alternatively, a well defined mathematical spot function may be selected. In the preferred embodiment, the spot function is a function of two variables, the location of each particular pixel relative to the center of the sub-halftone cell and an offset value which is assigned to each sub-halftone cell within the macro halftone cell which has the effect of ranking the sub-halftone cells among each other. FIG. 4 shows a macro halftone cell 30 which has been subdivided into nine sub-halftone cells 32 in which each sub-halftone cell has been marked alphabetically A–I in a predetermined order which ensures a scattering distribution of the pixels to be darkened with respect to the various sub-halftone cells of the macro halftone cell for any level of gray or hue concentration.

As set forth in Table 1 below, each sub-halftone cell A–I has an assigned offset value in accordance with the ranking of each sub-halftone cell within the macro halftone cell. For example, the center sub-halftone cell A has the highest ranking and has an associated offset value of 1.000 assigned to it. The next highest ranked halftone cell is halftone cell B which has the next highest assigned offset value of 0.999 and so on.

The location of each pixel within the macro halftone cell is assigned an x,y coordinate value in which the center pixel of the center halftone cell A is assigned the origin coordinate values (0,0). The macro halftone cell is subdivided into nine sub-halftone cells by eight boundary lines. In the illustrated embodiment of FIG. 4, these four boundary lines are defined by the lines x=1; x=0.333; x=−0.333; x=−1; y=1; y=0.333; y=−0.333 and y=1. Hence, pixels at the four corners of the macro halftone cell would have coordinate values at or near (1,1), (1,−1), (−1,1), and (−1,−1), respectively.

TABLE 1

| Sub-Halftone Cell | Pixel Location | Offset (R) |
| --- | --- | --- |
| B | X ≦ −0.333 and Y ≦ −0.333 | 0.999 |
| H | −0.333<X<0.333 and Y ≦ −0.333 | 0.993 |
| D | X ≧ 0.333 and Y ≦ −0.333 | 0.997 |
| E | X ≦ −.0333 and −0.333<Y<0.333 | 0.996 |
| A | −0.333<X<0.333 and −0.333<Y<0.333 | 1.0 |
| I | X ≧ 0.333 and −0.333<Y<0.333 | 0.992 |
| G | X ≦ −0.333 and Y > 0.333 | 0.994 |
| C | −0.333<X<0.333 and Y>0.333 | 0.998 |
| F | X ≧ 0.3333 and Y > 0.333 | 0.995 |

The location of the pixel in the sub-halftone cell with respect to the center of the sub-halftone cell and the offset value assigned to the sub-halftone cell in which the pixel is located determine the priority of the pixel within the macro halftone cell in accordance with the following spot function (a listing of Postscript programming instructions for the spot function defined by the equation below is shown in Appendix A):

$$\text{Priority} = R - (dX^2 + dY^2)$$

where:
R=offset value assigned to the sub-halftone cell
dX=location of the pixel in a first rectangular coordinate with respect to the center of the sub-halftone cell
dY=location of the pixel in a second rectangular coordinate orthogonal to the first rectangular coordinate with respect to the center of the sub-halftone cell It is seen from the above relationship that the closer a pixel is to the center of its sub-halftone cell, the higher the priority of the pixel within the sub-halftone cell since the coordinates dX, dY of the pixels increase in magnitude outwardly from the center of each sub-halftone cell, causing the priority value to decrease as the quantity $(dX^2+dY^2)$ increases. Furthermore, the offset value R of each sub-halftone cell ensures that the darkened pixels are well distributed amongst the sub-halftone cells. For example, in an embodiment that defines offset values consistent with the embodiment of FIG. 4 and Table 1, sub-halftone cell A containing a pixel 1 has an assigned offset value R of 1.000 and sub-halftone cell B containing a pixel 2 has an assigned offset value R of 0.999. Assuming that pixels 1 and 2 are located at the same location relative to the centers of the sub-halftone cells A and B, respectively, such that pixel 2 has the same dX and dY coordinates as pixel 1, the value of $dX^2+dY^2$ for pixel 2 would equal the corresponding value for pixel 1. However, since the sub-halftone cell having pixel 1 has a larger offset value R, pixel 1 has a higher priority than pixel 2. Hence, pixel 1 is ranked above pixel 2.

Figure 5:
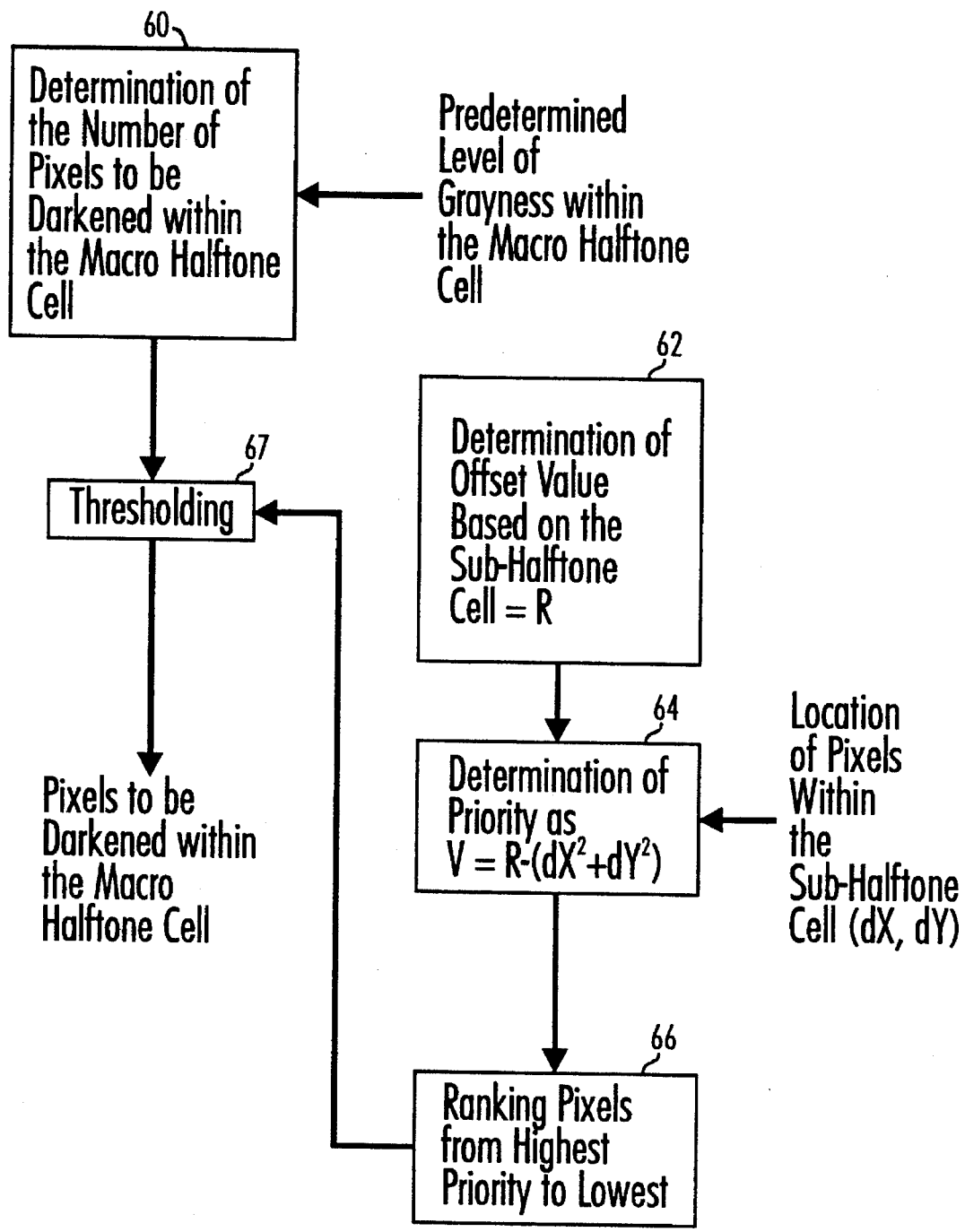
FIG. 5 is a flow chart to show the determination of pixel ranks for darkening the pixels within the halftone cell.

FIG. 5 shows a flow chart describing of the halftoning process of one embodiment of the present invention. The preferred embodiment determines the number of pixels to be darkened for each predetermined level of grayness at 60. An offset value R is assigned to each sub-halftone cell within a macro halftone cell at 62. Based on the locations of the pixels within the sub-halftone cell with respect to the center of the macro halftone cell, the system determines a priority for each pixel within the macro halftone cell at 64 as shown in the equation above. The preferred embodiment ranks all of the pixels within the macro halftone cell from highest to lowest at 66 based on the priority values of the pixels. Based on the number of pixels to be darkened as determined (at 60), a threshold is set (at 67) at which all pixels having a rank equal to or above the threshold are to be darkened. From this, for each level of gray or hue concentration within the macro halftone cell, specific pixels are selected to be darkened corresponding to the spot function of the macro halftone cell.

The listing of programming instructions of the preferred embodiment in Appendix A describes a process of determining priority values according to a circular spot function. As set forth in Table 1 above, the boundaries of the sub-halftone cells within the macro halftone are defined in terms of x and y coordinates which are centered at the center of the macro halftone cell. Thus, for each pixel, the process determines which sub-halftone cell the pixel is in based on the location of the pixel (with reference to the x and y coordinates) within the macro halftone cell. The process then converts the x, y macro halftone cell coordinates of the pixel to dX, dY sub-halftone cell coordinates which are centered at the center of the pixel's sub-halftone cell. The process then determines the priority value of each pixel based on the pixel's dX, dY sub-halftone cell coordinates and the offset value of the pixel's sub-halftone cell according to the equation above. A call may then be made to a standard Postscript routine to darken or not darken the pixel in accordance with the calculated priority value which is provided to the called routine for that pixel. Other suitable pixel darkening routines may be used as well.

Figure 6:
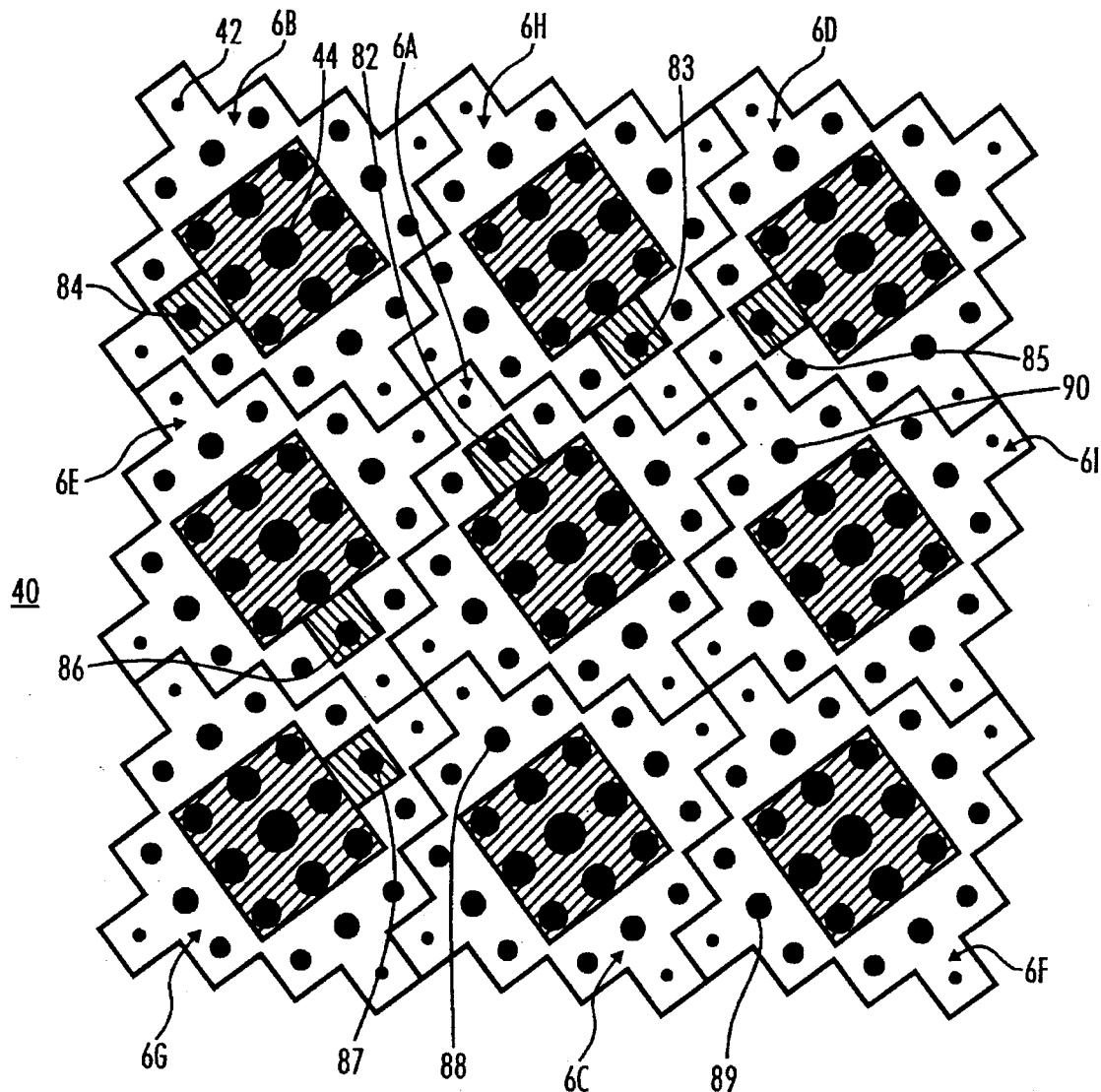
FIG. 6 is an illustration of halftoning over a macro halftone cell having a thirty seven degree screen angle.

In another embodiment, as shown in FIG. 6, the macro halftone cell employs a thirty seven degree screen angle to reduce objectionable patterns. Other screen angles may be employed to reduce objectionable patterns. As in the embodiments discussed above, the macro halftone cell 40 defines a region of 225 contiguous pixels partitioned into nine sub-halftone cells having twenty five contiguous pixels each. However, sub-halftone cells of this embodiment are not of a five pixel by five pixel geometry as in the sub-halftone cells of macro halftone cell 12 of FIG. 2.

The non-rectangular geometry of the sub-halftone cells making up the macro halftone cell 40 contributes to the scattering of the incrementally darkened pixels with respect to the locations of the individual sub-halftone cells and the distribution of the incrementally darkened pixels among the sub-halftone cells. The non-rectangular screen angles shift the X and Y coordinates of the pixels with respect to the center of macro halftone cell 40 so that the spot function with the respective offset values of the sub-halftone cells contribute to the scattering of the pixels.

The embodiment of FIG. 6 also uses the circular spot function to establish the ranking of pixels within macro halftone 40. Turning to sub-halftone cell 6B, the pixels are represented by dots of varying sizes. The size of the dot indicates the rank of the pixel within the sub-halftone cell 6B. For example, pixel 42, having one of the four smallest dots within sub-halftone cell 6B, has one of the four lowest ranks within the sub-halftone cell. Pixel 44, on the other hand, the center pixel of the sub-halftone cell, has the largest dot in the sub-halftone cell corresponding to the highest rank within the sub-halftone cell 6B.

To illustrate an example of using the halftoning process shown in FIG. 5 to the macro halftone cell embodiment of FIG. 6, a desired level of gray or hue concentration of 38.7% is assumed. The macro halftone cell is partitioned into the nine sub-halftone cells 6A through 6I. The offsets of sub-halftone cells 6A through 6I are the same as the offsets of sub-halftone cells A through H, respectively, of FIG. 4 and Table 1. At step 60, it is determined that 87 of the 225 pixels are to be darkened to achieve a gray level or hue concentration level of 38.7%. Since 87 is not an integer multiple of 9, at least one sub-halftone cells will have one more darkened pixel than at least one other sub-halftone cell.

FIG. 6 shows the highest ranking 81 pixels within the macro halftone cell in shaded regions as the center nine pixels within every sub-halftone cell. Since the center pixels within the sub-halftone cells have the smallest dX and dY values, they obtain the highest ranks within the respective sub-halftone cells. FIG. 7 identifies the locations of the 82nd through 90th ranked pixels. The resulting priority values are shown in the right hand column. The shaded portion of FIG. 7 indicates those additional pixels to be darkened beyond the first 81 pixels to illustrate the threshold at 87 pixels. Correspondingly, the pixels having the ranks of 82 through 87 are shown in shaded regions of the sub-halftone cells 6A, 6B, 6D, 6E, 6G and 6H with the first 81 pixels to be darkened of macro halftone cell 40.

Figure 8:
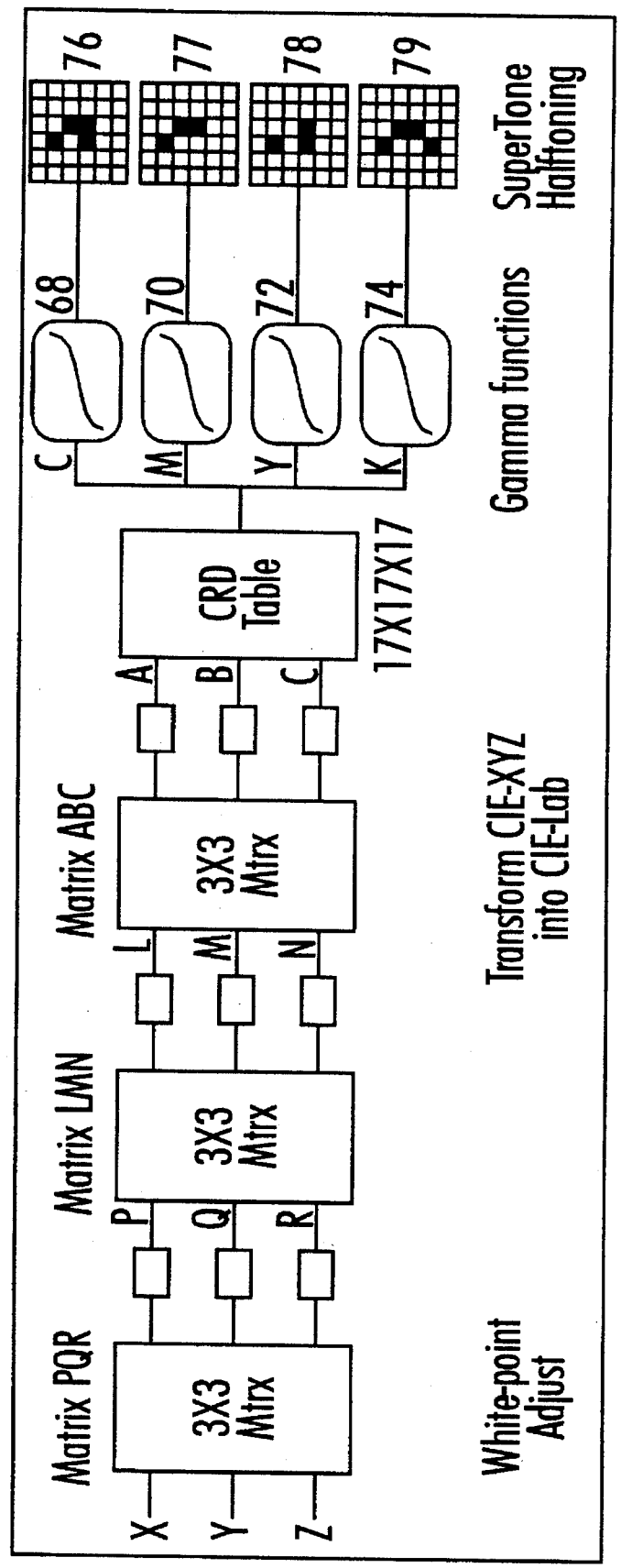
FIG. 8 depicts an embodiment that produces a color image.

FIG. 8 shows an embodiment of the present invention for halftoning in a color system that superimposes macro halftone cells of different hues so that the relative proportions of the hue concentrations determine the resulting color. Macro halftone cells 76, 77, 78 and 79, corresponding to the hues cyan, magenta, yellow and black respectively, are superimposed. Gamma functions 68, 70, 72 and 74 determine the intensity of the respective hues within macro halftone cells 76, 77, 78 and 79 respectively. These intensities are translated into hue concentrations. However, instead of scaling black against a white background for a gray image, the color embodiment scales a solid color with white in each of the superimposed macro halftone cells. The concentrations of each hue, cyan, magenta, yellow and black, determine the number of pixels to be darkened within the superimposed macro halftone cells 76, 77, 78 and 79. Accordingly, each of the macro halftone cells 76, 77, 78 and 79 are partitioned into sub-halftone cells of contiguous pixels as set forth above in Table A. A spot function as set forth in the equation above and Appendix A determines the ranks of the pixels within each sub-halftone cell of each superimposed macro halftone cell. An offset value for each sub-halftone cell within each macro halftone cell offsets the rank of pixels among different sub-halftone cells within a macro halftone cell. Once the priority for a pixel is determined, a call is made to a pixel darkening routine for each hue as shown in Appendix A. The values provided to the routine for each hue preferably include the screen frequency (for example, 20 macro halftone cells to the inch), the screen angle (for example, a screen angle of 37.0) and the priority value (as determined by the spot function).

The preferred embodiment of the color system performs halftoning to provide commands to a solid ink jet printer because the solid ink jet printer can generally produce circular dots with greater clarity. However, the disclosed color halftoning embodiments can be adapted to other systems for reproducing a color image having pixel values for superimposed cells as an input.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for halftoning in an area of pixels comprising:
   partitioning the pixels into macro halftone cells, each macro halftone cell having a plurality of sub-halftone cells, each sub-halftone cell defining an area of contiguous pixels;
   determining a quantity of pixels within a macro halftone cell to be darkened based on a predetermined level of grayness for the macro halftone cell; and
   ranking the pixels within the macro halftone cell from highest to lowest, such that:
      no two pixels within the same sub-halftone cell are ranked consecutively;
      the rank of each individual pixel within each sub-halftone cell is a decreasing function of the distance between the center of the sub-halftone cell and the center of the pixel, wherein a pixel closest to the center of the sub-halftone cell has the highest rank of pixels within the sub-halftone cell and a pixel furthest from center of the sub-halftone cell has the lowest rank of pixels within the sub-halftone cell; and
      the number of pixels ranked above any particular pixel within the sub-halftone cell is no more than one greater and no more than one less than the number of pixels ranked above said particular pixel in any other sub-halftone cell within the macro halftone cell.

2. The method of claim 1, the method further including darkening each pixel having a rank higher than or equal to a threshold ranking, wherein the threshold ranking is a function of the quantity of pixels to be darkened.

3. The method of claim 1, wherein the pixels to be darkened within each sub-halftone cell are contiguous.

4. The method of claim 2, the method further including darkening pixels within each sub-halftone cell such that all darkened pixels within each sub-halftone are contiguous.

5. A method for halftoning in an area of pixels, the method comprising:
   partitioning the pixels into macro halftone cells, each macro halftone cell having a plurality of sub-halftone cells, each sub-halftone cell defining an area of contiguous pixels;
   determining a quantity of pixels within a macro halftone cell to be darkened based on a predetermined level of grayness for the macro halftone cell; and
   ranking the pixels within the macro halftone cell from highest to lowest in accordance with a spot function such that:
      no two pixels within the same sub-halftone cell are ranked consecutively; and
      the number of pixels ranked above any particular pixel within the sub-halftone cell is no more than one greater and no more than one less than the number of pixels ranked above said particular pixel in any other sub-halftone cell within the macro halftone cell.

6. The method of claim 5, the method further including darkening each pixel having a rank higher than or equal to a threshold ranking, wherein the threshold ranking is a function of the quantity of pixels to be darkened.

7. The method of claim 5, the method further including darkening pixels within each sub-halftone cell such that all darkened pixels within each sub-halftone are contiguous.

8. The method of claim 5, wherein each sub-halftone to be darkened having a pre-defined minimum of contiguous darkened pixels centered about the center of the sub-halftone cell.

9. A method for halftoning in an area of pixels comprising:
   partitioning the pixels into macro halftone cells, each macro halftone cell having an area of v x w sub-halftone cells, each sub-halftone cell defining an area of contiguous pixels, wherein:
      v and w are positive odd integers; and
      each sub-halftone cell comprises a center;
   determining a quantity of pixels within a macro halftone cell to be darkened based on a predetermined level of grayness within the macro halftone cell; and
   allocating the pixels to be darkened within the macro halftone cell among the sub-halftone cells such that:
      no one sub-halftone cell comprises more than one darkened pixel more than any other sub-halftone cell; and
      at least one of the center pixels of each sub-halftone cell is darkened.

10. The method of claim 9, wherein v and w are the same positive odd integer.

11. The method of claim 9, the method further including darkening the pixels to be darkened within the macro halftone cell.

12. The method of claim 10, wherein the pixels to be darkened within each sub-halftone cell are contiguous.

13. The method of claim 11, the method further including darkening pixels within sub-halftone cells such that all darkened pixels with in the sub-halftone cells are contiguous.

14. A method for color halftoning over a plurality of output pixels, the method comprising:
   partitioning the image into a plurality of halftoning regions defining an area of contiguous pixels, each halftoning region having a center;
   defining a plurality of macro halftone cells for each halftoning region, each macro halftoning cell corresponding to a hue to be superimposed with the hues of other macro halftone cells within the same halftoning region;

partitioning each macro halftone cell into a plurality of sub-halftone cells, each sub-halftone cell defining an area of contiguous pixels, wherein each sub-halftone cell comprises a center;

determining a quantity of pixels within each macro halftone cell to be darkened based on a predetermined level of hue intensity for each macro halftone cell; and ranking the pixels within each macro halftone cell from highest to lowest, such that:

no two pixels within the same sub-halftone cell are ranked consecutively;

the rank of each individual pixel within each sub-halftone cell is a decreasing function of the distance between the center of the sub-halftone cell and the center of the pixel, wherein a pixel closest to the center of the sub-halftone cell has the highest rank of pixels within the sub-halftone cell and a pixel furthest from center of the sub-halftone cell has the lowest rank of pixels within the sub-halftone cell; and the number of pixels ranked above any particular pixel within each particular sub-halftone cell is no more than one greater and no more than one less than the number of pixels ranked above said particular pixel in any other sub-halftone cell within the macro halftone cell containing said particular sub-halftone cell.

15. The method of claim 14, the method further including darkening each pixel having a rank higher than or equal to a threshold ranking, wherein the threshold ranking defines the quantity of pixels to be darkened within the corresponding macro halftone cell, thereby superimposing the hues of all macro halftone cells within each halftoning region.

16. A method for color halftoning over a plurality of output pixels, the method comprising:

partitioning the image into a plurality of halftoning regions defining an area of contiguous pixels;

defining a plurality of macro halftone cells for each halftoning region, each macro halftoning cell corresponding to a hue to be superimposed with the hues of other macro halftone cells within the same halftoning region;

partitioning the macro halftone cells into an area of v x w sub-halftone cells, each sub-halftone cell defining an area of contiguous pixels, wherein:

v and w are positive odd integers;

each sub-halftone cell comprises a center; and determining a quantity of pixels within each macro halftone cell to be darkened based on a predetermined level of intensity of hue over each macro halftone cell.

17. The method of claim 16, the method further including darkening each pixel having a rank higher than or equal to a threshold ranking, wherein the threshold ranking is equal to the quantity of pixels to be darkened within the corresponding macro halftone cell, thereby superimposing the hues of all macro halftone cells within each halftoning region.

18. The method of claim 17, the method further including darkening the quantity of pixels within each macro halftone cell to be darkened wherein:

no one sub-halftone cell comprises more than one darkened pixel more than any other sub-halftone cell within the corresponding macro halftone cell; and at least one of the center pixels of each sub-halftone cell is darkened.

19. The method of claim 16, wherein v and w are the same positive odd integer.

20. A system for producing a halftone image through a plurality of output pixels, the system comprising:

means for partitioning the image into a plurality of macro halftone cells, each macro halftone cell defining an area of contiguous pixels and having a center;

means for partitioning each macro halftone cell into a plurality of sub-halftone cells defining an area of pixels, each sub-halftone cell having a center;

means for determining a quantity of pixels to be darkened for each macro halftone cell based on a predetermined level of intensity over each macro halftone cell; and means for ranking the pixels within each macro halftone cell from highest to lowest such that:

no two pixels within the same sub-halftone cell are ranked consecutively;

the rank of each individual pixel within each sub-halftone cell is a decreasing function of the distance between the center of the sub-halftone cell and the center of the pixel, wherein a pixel closest to the center of the sub-halftone cell has the highest rank of pixels within the sub-halftone cell and a pixel furthest from center of the sub-halftone cell has the lowest rank of pixels within the sub-halftone cell; and the number of pixels ranked above any particular pixel within the sub-halftone cell is no more than one greater and no more than one less than the number of pixels ranked above said particular pixel in any other sub-halftone cell within the corresponding macro halftone cell.

21. The system of claim 20, the system further comprising means for darkening each pixel having a rank higher than or equal to a threshold ranking, wherein the threshold ranking is set in accordance with the quantity of pixels to be darkened within the corresponding macro halftone cell.

22. A system for producing a halftone image through a plurality of output pixels, the system comprising:

means for partitioning the image into a plurality of macro halftone cells, each macro halftone cell defining an area of contiguous pixels;

means for partitioning each macro halftone cell into an area of v x w sub-halftone cells, each sub-halftone cell defining an area of contiguous pixels, wherein:

v and w are positive odd integers; and each sub-halftone cell comprises a center;

means for determining a quantity of pixels within for each macro halftone cell to be darkened based on a predetermined level of intensity within each particular macro halftone cell; and means for darkening the quantity of pixels within each macro halftone cell to be darkened such that:

no one sub-halftone cell comprises more than one darkened pixel more than any other sub-halftone cell within the corresponding macro halftone cell; and at least one of the center pixels of each sub-halftone cell is darkened.

23. The method of claim 22, wherein v and w are the same positive odd integer.

24. A system for producing a color image having a plurality of hues through a plurality of output pixels, the system comprising:

means for partitioning the image into a plurality of halftoning regions, each halftoning region defining an area of contiguous pixels and having a center;

means for determining a quantity of pixels to be darkened for each hue for each halftoning region based on predetermined levels intensity for the hues over each halftoning region;

a plurality of superimposed macro halftone cells, each macro halftone cell defining the pixels in a halftoning region corresponding to one of said hues;

means for partitioning each macro halftone cell into a plurality of sub-halftone cells defining an area of pixels, each sub-halftone cell having a center;

means for ranking the pixels within each macro halftone cell from highest to lowest such that:
  no two pixels within the same sub-halftone cell are ranked consecutively;
  the rank of each individual pixel within each sub-halftone cell is a decreasing function of the distance between the center of the sub-halftone cell and the center of the pixel, wherein a pixel closest to the center of the sub-halftone cell has the highest rank of pixels within the sub-halftone cell and a pixel furthest from center of the sub-halftone cell has the lowest rank of pixels within the sub-halftone cell; and
  the number of pixels ranked above any particular pixel within the sub-halftone cell is no more than one greater and no more than one less than the number of pixels ranked above said particular pixel in any other sub-halftone cell within the corresponding macro halftone cell; and means for darkening each pixel having a rank higher than or equal to a threshold ranking, wherein the threshold ranking is equal to the quantity of pixels to be darkened within the corresponding macro halftone cell.

* * * * *

UNITED STATES PATENT AND TRADEMARK OFFICE
CERTIFICATE OF CORRECTION

PATENT NO. : 5,587,811
DATED : December 24, 1996
INVENTOR(S) : Jae-Hwal Yoo

It is certified that error appears in the above-indentified patent and that said Letters Patent is hereby corrected as shown below:

Title page, item [75], Inventor: change "Thomas A. Ligouri, San Diego, Calif." to --Jae-Hwal Yoo, West Hills, Calif.--.

Signed and Sealed this

Sixth Day of May, 1997

*Attest:*

BRUCE LEHMAN

*Attesting Officer*  *Commissioner of Patents and Trademarks*